(12) United States Patent
BenHanokh et al.

(10) Patent No.: US 12,346,341 B2
(45) Date of Patent: Jul. 1, 2025

(54) USING DYNAMIC DATA STRUCTURES FOR STORING DATA OBJECTS

(71) Applicant: RED HAT, INC., Raleigh, NC (US)

(72) Inventors: Gabriel Zvi BenHanokh, Tel-Aviv (IL); Uri Lublin, Raanana (IL)

(73) Assignee: Red Hat, Inc., Raleigh, NC (US)

( * ) Notice: Subject to any disclaimer, the term of this patent is extended or adjusted under 35 U.S.C. 154(b) by 126 days.

(21) Appl. No.: 17/386,639

(22) Filed: Jul. 28, 2021

(65) Prior Publication Data

US 2023/0034198 A1 Feb. 2, 2023

(51) Int. Cl.
| | |
|---|---|
| G06F 16/25 | (2019.01) |
| G06F 16/21 | (2019.01) |
| G06F 16/22 | (2019.01) |
| G06F 16/23 | (2019.01) |
| G06N 20/00 | (2019.01) |

(52) U.S. Cl.
CPC .......... *G06F 16/258* (2019.01); *G06F 16/219* (2019.01); *G06F 16/2291* (2019.01); *G06F 16/2365* (2019.01); *G06N 20/00* (2019.01)

(58) Field of Classification Search
CPC .... G06F 16/258; G06F 16/2291; G06N 20/00
See application file for complete search history.

(56) References Cited

U.S. PATENT DOCUMENTS

| | | | | |
|---|---|---|---|---|
| 6,324,495 | B1 * | 11/2001 | Steinman ................. | G06F 30/20 713/502 |
| 6,446,257 | B1 * | 9/2002 | Pradhan .............. | G06F 12/0276 711/E12.012 |
| 8,738,578 | B1 * | 5/2014 | Nell ........................ | G06F 16/22 711/170 |
| 8,819,077 | B1 * | 8/2014 | van Rotterdam ....... | G06F 16/83 707/802 |
| 9,092,466 | B1 * | 7/2015 | van Rotterdam ....... | G06F 16/80 |
| 10,423,889 | B2 * | 9/2019 | Phillipps ................ | G06Q 10/04 |

(Continued)

FOREIGN PATENT DOCUMENTS

| | | | | |
|---|---|---|---|---|
| CN | 103714129 | A * | 4/2014 | ....... G06F 17/30404 |
| CN | 109657103 | A * | 4/2019 | |

(Continued)

OTHER PUBLICATIONS

Schiller, Benjamin, et al. "Compile-and run-time approaches for the selection of efficient data structures for dynamic graph analysis." Applied network science 1 (2016): 1-22. (Year: 2016).*

(Continued)

*Primary Examiner* — Dennis Truong
(74) *Attorney, Agent, or Firm* — Kilpatrick Townsend & Stockton LLP

(57) ABSTRACT

A technique for dynamic data structure usage for storing data objects is described. In one example of the present disclosure, a system can receive a data object and properties associated with the data object. The system can determine, based on at least one of the properties and pre-defined rules for data objects and corresponding object types, an object type of the data object and a first data structure for storing the data object that is different from a second data structure currently storing data objects in the memory. The system can output a command for causing the first data structure to store the data object in the memory.

17 Claims, 7 Drawing Sheets

(56) References Cited

U.S. PATENT DOCUMENTS

| | | |
|---|---|---|
| 10,706,030 B2 | 7/2020 | Ghatage et al. |
| 11,467,927 B2 * | 10/2022 | Rachapudi .......... G06F 11/1464 |
| 2002/0087563 A1 * | 7/2002 | Ghemawat ........... G06F 16/2282 |
| 2003/0009482 A1 * | 1/2003 | Benerjee ............... G06F 9/5016 |
| 2003/0061227 A1 * | 3/2003 | Baskins ............... G06F 16/9027 |
| 2004/0015515 A1 * | 1/2004 | Beisiegel ................. G06F 8/51 |
| 2005/0246390 A1 * | 11/2005 | House .................... G06F 16/22 |
| 2006/0059326 A1 * | 3/2006 | Aasheim ............ G06F 12/0246 |
| | | 711/E12.008 |
| 2006/0117251 A1 * | 6/2006 | Rothschiller ......... G06F 40/143 |
| | | 715/236 |
| 2007/0078877 A1 * | 4/2007 | Ungar ................. G06F 40/143 |
| 2009/0157636 A1 * | 6/2009 | Mackie ................ G06F 16/284 |
| 2009/0282397 A1 * | 11/2009 | Leporini ................ G06F 21/51 |
| | | 726/30 |
| 2010/0057792 A1 * | 3/2010 | Ylonen ............... G06F 12/0253 |
| | | 707/E17.009 |
| 2010/0191777 A1 * | 7/2010 | Ylonen .................. H04L 69/04 |
| | | 707/E17.005 |
| 2012/0110108 A1 * | 5/2012 | Li ......................... G06F 12/123 |
| | | 709/213 |
| 2013/0086015 A1 * | 4/2013 | van Rotterdam ... G06F 16/2379 |
| | | 707/E17.005 |
| 2014/0195466 A1 * | 7/2014 | Phillipps ................. G06F 16/00 |
| | | 706/12 |
| 2016/0103869 A1 * | 4/2016 | Raufman ............ G06F 16/2272 |
| | | 707/693 |
| 2017/0177662 A1 * | 6/2017 | Lam .................... G06F 16/2453 |
| 2018/0122497 A1 * | 5/2018 | Pietronigro ............ G16H 10/20 |
| 2019/0236173 A1 * | 8/2019 | Ghatage .................. G06F 16/22 |
| 2020/0012970 A1 * | 1/2020 | Srivastava .............. G06F 16/23 |
| 2020/0104196 A1 * | 4/2020 | Ritchie ............... G06F 13/1663 |
| 2020/0183659 A1 * | 6/2020 | Bojara .................. H04L 63/101 |
| 2020/0320100 A1 * | 10/2020 | Piecko .................... G06F 16/26 |
| 2021/0149671 A1 * | 5/2021 | Sar Shalom ........... G06N 5/022 |
| 2021/0264297 A1 * | 8/2021 | Shtof ....................... G06N 5/04 |
| 2021/0271986 A1 * | 9/2021 | Hu ......................... G06N 20/00 |

FOREIGN PATENT DOCUMENTS

| | | | | |
|---|---|---|---|---|
| EP | 1265159 A2 * | 12/2002 | ....... | G06F 17/30961 |
| EP | 3537448 A1 * | 9/2019 | ............ | G06F 16/22 |
| GB | 2464179 A * | 4/2010 | .......... | G06F 9/4428 |
| WO | 2020223084 A1 | 11/2020 | | |
| WO | WO-2021217659 A1 * | 11/2021 | | |

OTHER PUBLICATIONS

Skiena, Steven S., and Steven S. Skiena. "Data Structures." The Algorithm Design Manual (2020): 69-108. (Year: 2020).*

Idreos, S., et al., "Learning Data Structure Alchemy," Bulletin of the IEEE Computer Society Technical Committee on Data Engineering, 2019, https://stratos.seas.harvard.edu/publications/learning-data-structure-alchemy.

* cited by examiner

USING DYNAMIC DATA STRUCTURES FOR STORING DATA OBJECTS

TECHNICAL FIELD

The present disclosure relates generally to data object storage. More specifically, but not by way of limitation, this disclosure relates to using dynamic data structures for storing data objects.

BACKGROUND

Data objects can be stored in memory devices as pages. During a paging-in operation, a page of data objects is read from a disk storage device and written to the memory device. The data objects are stored in the memory device in a data structure to organize the data objects for subsequent operations. In some cases, memory devices may support one or multiple data structures at a time. Memory devices may be part of individual computing systems, such as personal computers, or the memory devices may be a component of a distributed computing system.

Distributed computing systems such as cloud computing environments, computing clusters, and data grids have recently grown in popularity. A distributed computing system can include multiple nodes, such as physical machines or virtual machines, in communication with one another over a network, such as a local area network or the Internet.

DETAILED DESCRIPTION

Figure 1:
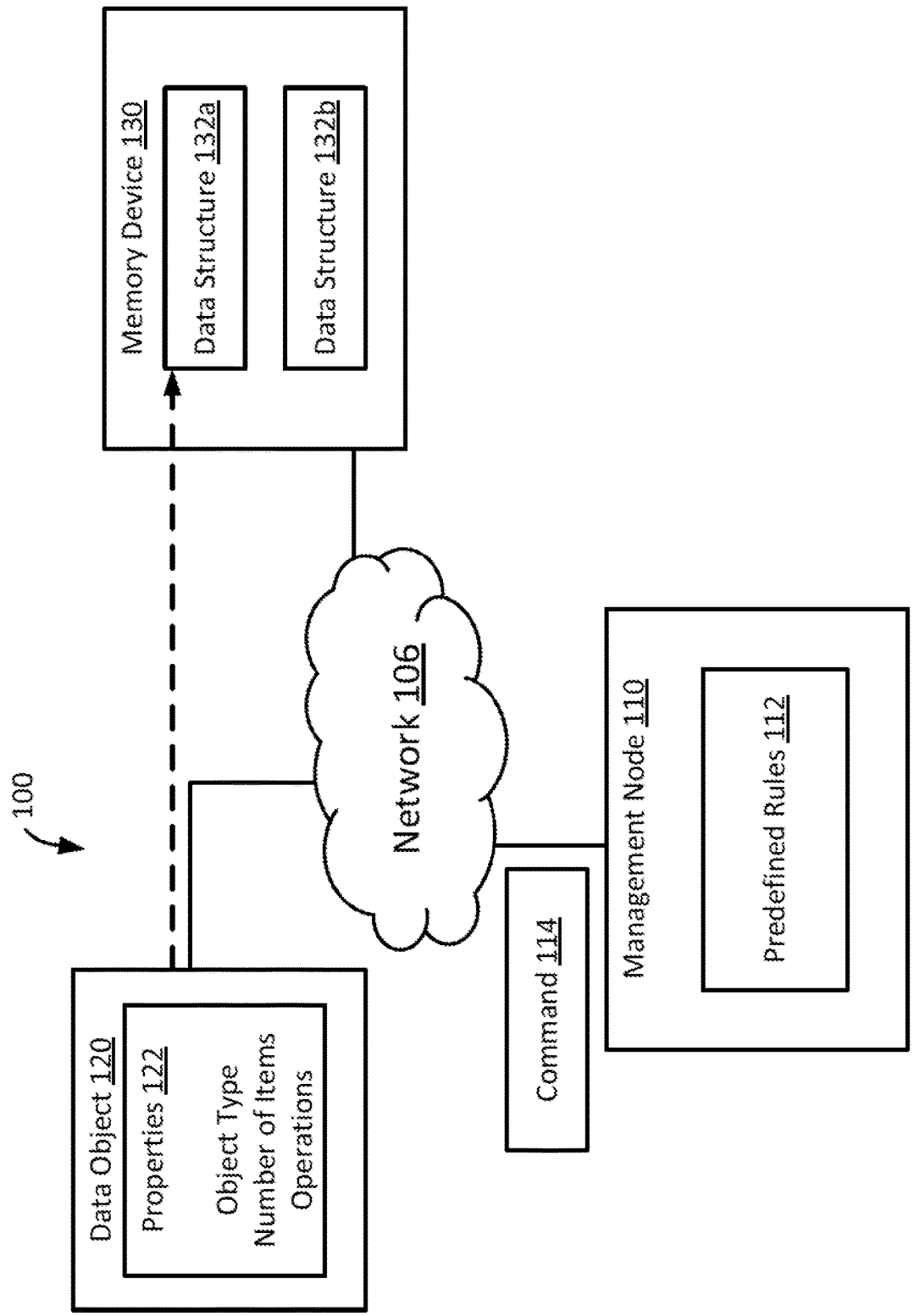
FIG. 1 shows a block diagram of an example of a distributed computing system for implementing dynamic data structure usage for storing data objects according to some aspects of the present disclosure.

Data objects, such as those for metadata, can be stored in a data structure of a memory device. The data structure can be selected by a developer during an implementation phase when the number of data objects that will be stored in the data structure and the access pattern may not yet be known. At the implementation phase, the pattern of insertions, removals, accesses, and so on for the data objects may also not be known, so the user may select a data structure based on the data structure's capability of storing various types of data objects. Each data structure can perform differently depending on the data objects being stored, so selecting a suboptimal data structure for the data objects may result in excessive memory and processing power consumption. For example, a vector data structure may consume less memory than other data structures and may be efficient for processing sequential accesses, however, may be suboptimal for unsorted data objects that are accessed in a random order to identify the object data. Additionally, a hash table may perform well for a large number of data objects accessed directly, but the hash table may consume extra memory and randomly store locations of data objects, so data prefetching may be suboptimal. A binary search tree, such as a red-black tree, may perform well for medium-sized datasets that are sorted and involve quick access, such as for in-order iterations or a high number of insertion or removal operations. But, binary search trees may consume excessive memory and experience cache misses because the memory is not continuous. Other data structures, such as sorted vectors, heaps, and skip lists, may have similar benefits and drawbacks. Since the pattern of operations, such as insertions, removals, and accesses, used for a data object or a set of data objects is often unknown at the time of selecting the data structure, a suboptimal data structure may be selected that uses excessive computing resources.

Some examples of the present disclosure can overcome one or more of the abovementioned problems by providing a system for dynamic data structure usage for storing data objects. The system may be implemented on a single computing device or in a distributed computing system. The system can receive one or more data objects and properties associated with the one or more data object. The properties can include an object type of the one or more data objects, a number of items associated with the one or more data objects, an access type for the one or more data objects, and operations associated with the one or more data objects. The system can determine, based on the properties, the object type of the one or more data objects. The system can then determine, based on pre-defined rules for data objects and corresponding object types, a first data structure for storing the one or more data objects that is different from a second data structure currently storing data objects in a memory device. The pre-defined rules may additionally include rules for determining the data structure from any combination of the object type, the number of items, and the operations associated with the one or more data object. The system may alternatively use a machine-learning model to determine the first data structure for storing the one or more data objects based on the access type and any other of the other properties. The system can output a command for causing the first data structure to store the one or more data objects in the memory device. This can allow for memory to be used efficiently for storing data objects so that more memory can be used for processes other than data object storage, which may improve the performance of the system.

As one example, a system can receive a data object as part of a paging-in operation. The data object can hold ten disk extents. The system can use pre-defined rules to determine that a data object holding less than one hundred disk extents is to be stored in a vector. The system can also determine that a memory device currently stores data objects in a binary search tree data structure. The system can then output a command for causing the vector to be generated in the memory device and the data object can be stored in the vector.

As another example, a management node of a distributed computing system can receive multiple data objects and properties associated with the multiple data objects. The management node can determine the data objects are associated with a high number of random accesses, a high number of searches, and the data objects include one-thousand items. The access type and the number of items can be input to a machine-learning model, which can output a recommendation for a hash table for storing the multiple data objects. The management node can determine that a memory device of the distributed computing system currently stores data objects in a skip list. The management node can then output a command to the memory device that includes the recommendation of the hash table. The hash table can then be generated in the memory device, and the multiple data objects can be stored in the hash table. Thus, one or more data objects can be stored in a data structure for optimal usage of the one or more data objects and performance of the system.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 shows a block diagram of an example of a distributed computing system 100 for implementing dynamic data structure usage for storing data objects according to some aspects of the present disclosure. The distributed computing system 100 includes a management node 110 (e.g., a physical machine or a virtual machine) in communication with a memory device via one or more networks 106, such as a local area network or the Internet. In some examples, the distributed computing system 100 may alternatively be a single device, such as a laptop, desktop, or other computing device. Accordingly, a processor of the device can perform operations rather than the management node 110.

The management node 110 can receive a data object 120, such as a metadata object or any other suitable data object, and properties 122 associated with the data object 120. The data object 120 may be stored on a disk storage device, such as a hard disk drive, solid state drive, spinning disk, and the like, and the management node 110 can receive the data object 120 as part of a paging-in operation from the disk storage device to a memory device 130. Paging-in may involve an object page-in operation in which a component, such as an object pool or an object cache, manages data objects in a memory device and loads data objects into the memory device from a disk storage device or another storage entity. Alternatively, the management node 110 may receive the data object 120 during a background-processing operation for determining suitable data structures or when a new data object is being created. The management node 110 may receive the data object 120 in response to an operation performed using an application programming interface (API) of an object-oriented programming language, such as C++ or java. As part of the paging-in operation, a transformation, such as deserialization, may be performed on the data object 120 prior to being written to the memory device 130. Examples of the properties 122 that the management node 110 can receive for the data object 120 can include an object type, a number of items in the data object 120, and operations associated with the data object 120. The object type can specify whether the data object 120 is holding disk extents, a directory, and so on, the number of items can specify a number of extents or a number of files in the directory, or another number of items associated with the object type, and the operations associated with the data object 120 can include searches, iterations, removals, insertions, etc. for the data object 120.

The memory device 130 may be storing other data objects in a first data structure 132a. The first data structure 132a may have been designated by a user or may have been previously determined by the management node 110 based on the other data objects being stored in the first data structure 132a. For example, the user may generate the first data structure 132a to be a skip-list because of its flexibility for storing various data objects. But, depending on the data objects being stored, the skip-list may be suboptimal and consume more memory and processing resources than other data structures. If a data object is first being created, the management node 110 can store the data object in the first data structure 132a that is designated by the user. Properties for the data object, such as access pattern history and average, minimum, maximum, and a median count of items for data objects of the object type in the distributed computing system 100, can then be received by the management node 110, which can use the properties to determine a different data structure for more effectively storing the data object.

In some examples, the management node 110 can use pre-defined rules 112 to determine a second data structure 132b for storing the data object 120 based on the object type of the data object 120. For example, the pre-defined rules 112 may specify that a first data structure is to be used for data objects that hold disk extents and a second data structure is to be used for data objects that hold a directory. The management node 110 can determine that the data object 120 holds disk extents, so the second data structure 132b is to be a red-black tree based on the pre-defined rules 112.

The pre-defined rules 112 may additionally specify data structures based on the number of items associated with data objects. The pre-defined rules 112 may include associations between the number of items and data structures, without considering the object type, or the pre-defined rules 112 may associate object types and the number of items to data structures. For example, the pre-defined rules 112 may specify that a data object holding a lower number of disk extents, such as ten, is to be stored in a first data structure (e.g., a vector), while a data object holding a higher number of disk extents, such as one thousand, is to be stored in a second data structure (e.g., a red-black tree). The management node 110 can determine that the data object 120 holds one thousand disk extents, and thus that the second data structure 132b is to be a red-black tree.

In some examples, the pre-defined rules 112 may also specify data structures based on the operations associated with data objects. The pre-defined rules 112 may specify associations between data structures and any combination of object type, number of items, and operations for the data objects. As an example, the pre-defined rules 112 may specify that a high number of searches for the data object 120 corresponds to a first data structure (e.g., a hash table), whereas a high number of iteration operations for the data object 120 corresponds to a second data structure (e.g., a binary search tree).

According to the pre-defined rules 112, the management node 110 can determine the second data structure 132b for storing the data object 120. For example, the management node 110 can determine that the second data structure 132b is to be a vector for the data object 120 based on the pre-defined rules 112. The management node 110 can then output a command 114 for causing the second data structure 132*b* to store the data object 120 in the memory device 130. The management node 110 may additionally perform data transformation or formatting for the data object 120 to fit the second data structure 132*b*. The memory device 130 may include the second data structure 132*b* prior to the command 114, or the memory device 130 may generate the second data structure 132*b* based on the command 114. If the data object 120 is received as part of a paging-in operation, the memory device 130 may not include the first data structure 132*a* prior to generating the second data structure 132*b*. If the management node 110 performs a background-processing operation to determine the second data structure 132*b* while the first data structure 132*a* is in the memory device 130, the memory device 130 may generate the second data structure 132*b* by replacing the first data structure 132*a* with the second data structure 132*b*. The data object 120 can then be stored in the second data structure 132*b*. As a result, the distributed computing system 100 can optimally store data objects based on their properties for better memory and resource usage. Additionally, the API can be kept the same for each data structure, such that dynamically changing the data structure does not affect components of the distributed computing system 100 that use the previous data structures.

A small amount of memory, such as a byte or less, may be used for the data object 120 to record an enumeration value that indicates the first data structure 132*a* is used for the data object 120. The enumeration value may be used as an entry into a virtual objects or function table, such that accesses can be performed automatically based on the first data structure 132*a* currently being used.

At some point in time, the management node 110 may receive another data object during a subsequent paging-in operation and determine that the properties associated with the other data object correspond to a binary search tree data structure based on the pre-defined rules 112. The management node 110 can then output a second command for causing the binary search tree data structure to be generated in the memory device 130 and store the other data object in the binary search tree data structure.

It will also be appreciated that although FIG. 1 depicts a certain number and arrangement of components, other examples may include more components, fewer components, different components, or a different number of the components that is shown in FIG. 1. For instance, the distributed computing system 100 can include more or fewer data structures than are shown in FIG. 1. Additionally, the components (e.g., the data object 120, the pre-defined rules 112, and the memory device 130) depicted as being in communication via the network 160, may alternatively be part of a single computing system. Although aspects of FIG. 1 are described with respect to a paging-in operation, the operations in other examples may be part of a paging-out operation, an online-processing operation (e.g., during creation of a data object or loading a data object into an objects cache), or a background-processing operation. For the background-processing operation, a data structure in the memory device 130 can be modified automatically for existing data objects. The management node 110 may receive information about each data object stored in the distributed computing system 100 to determine which data structure should be included in the memory device 130. For example, the management node 110 may determine a global access pattern for the data objects in the distributed computing system 130 and change the data structure to a data structure better suited for storing data objects associated with the global access pattern.

Figure 2:
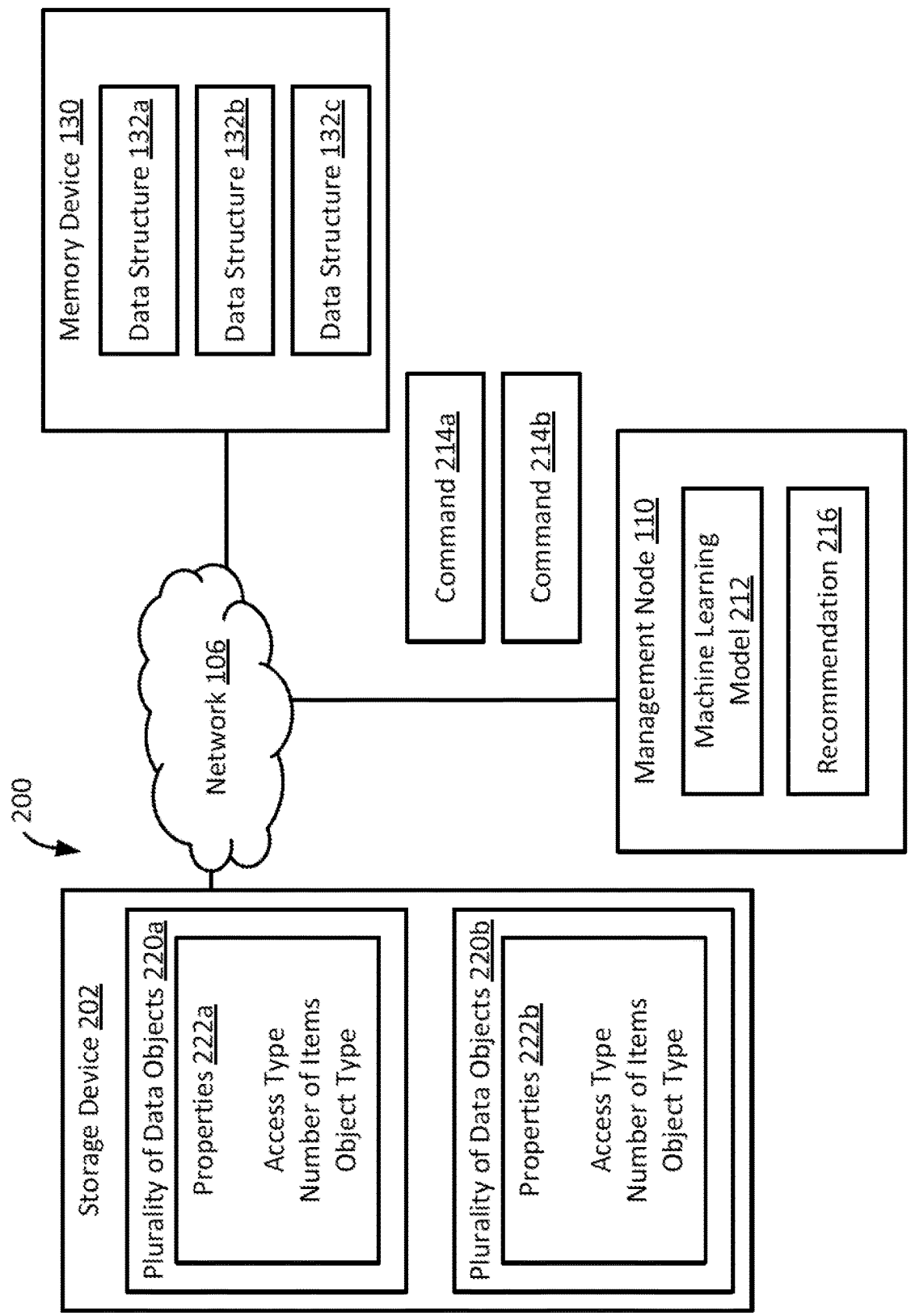
FIG. 2 shows a block diagram of another example of distributed computing system for implementing dynamic data structure usage for storing data objects according to some aspects of the present disclosure.

Another example of a distributed computing system 200 for implementing dynamic data structure usage for storing data objects is shown in FIG. 2. The distributed computing system 200 can include a management node 110, a storage device 202, and a memory device 130 that can communicate via a network 106, such as a local area network or the Internet. The storage device 202 may be a hard disk drive, solid state drive, spinning disk, or any other suitable storage device.

In some examples, the management node 110 can receive a plurality of data objects 220*a* and properties 222*a* associated with the plurality of data objects 220*a*. The properties 222*a* can include an access type for the plurality of data objects 220*a*, a number of items in each data object of the plurality of data objects 220*a*, and an object type for each data object of the plurality of data objects 220*a*. The properties 222*a* may additionally include operations associated with the plurality of data objects 220*a*. The number of items, the object type, and the operations can be those previously described in FIG. 1. Examples of the access type can include random access, sequential access, in-order access, etc. The properties 222*a* may additionally include the access type for the object type globally in the distributed computing system 200.

The management node 110 can determine a second data structure 132*b* for storing the plurality of data objects 220*a* based on the properties 222*a*. For example, the management node 110 may use the access type and number of items in the plurality of data objects 220*a* to determine the second data structure 132*b*. As one particular example, if the plurality of data objects 220*a* is associated with a high number of random searches and there is a high number of items, the management node 110 can determine that the second data structure 132*b* is to be a hash table. In another example, if the plurality of data objects 220*a* are associated with a high number of in-order accesses and there is a high number of items, the management node 110 can determine that the second data structure 132*b* is to be a red-black tree. The second data structure 132*b* may be different from a first data structure 132*a* that is currently storing data objects. The management node 110 may use pre-defined rules, such as the pre-defined rules 112 in FIG. 1, or a machine-learning model 212 to determine the second data structure 132*b* based on the properties 222*a*.

Examples of the machine-learning model 212 can include neural networks such as recurrent neural networks, decision trees such as classification and regression trees, classifiers such as naïve bias classifiers and random forest classifiers, or any combination of these. The machine-learning model 212 can be trained based on historical information about access types, numbers of items, object types, operations performed on data objects, and associated data structures for storing data objects. For example, the machine-learning model 212 can be trained based on training data that includes datasets of data objects having varying access types, numbers of items, and operations performed on data objects. This training data can be generated by performing operations in one or more computing systems or based on logged information about data objects in one or more computing systems. The training data may include labels indicating the data structure to be associated with each dataset. The training may involve minimizing one or more loss functions. Once trained, the machine-learning model 212 can be configured to receive the access type and the number of items associated with each data object of the plurality of data objects 220*a* and output a recommendation 216 of the second data structure 132*b*. The machine-learning model 212 may additionally receive the object type or the operations associated with the plurality of data objects 220a to determine the recommendation 216.

The management node 110 can output a command 214a that includes the recommendation 216 for causing the second data structure 132b to be generated in the memory device 130. In response to the command 214a, space in the memory device 130 may be allocated for the second data structure 132b and then the memory device 130 can create the second data structure 132b. The second data structure 132b may replace the first data structure 132a, or both of the first data structure 132a and the second data structure 132b may be in the memory device 130 at the same time.

The management node 110 may then receive a second plurality of data objects 220b and properties 222b associated with the second plurality of data objects 220b. The management node 110 can determine the access type and the number of items associated with each data object of the second plurality of data objects 220b from the properties 222b. If either or both of the access type or the number of items is different from the access type and number of items associated with the plurality of data objects 220a, the management node 110 may determine a third data structure 132c, which is different from the second data structure 132b, is to store the second plurality of data objects 220b. Additionally or alternatively, the management node 110 may determine the third data structure 132c based on the object types or operations associated with the second plurality of data objects 220b.

The management node 110 can output a second command 214b for causing the third data structure 132c to be generated in the memory device 130. In some examples, the third data structure 132c exists in the memory device 130 along with the second data structure 132b. In other examples, the third data structure 132c may replace the second data structure 132b in the memory device 130. During a paging-in operation, the third data structure 132c may be generated in the memory device 130 without the first data structure 132a or the second data structure 132c being in the memory device 130. The memory device 130 can then store the second plurality of data objects 220b in the third data structure 132c. As such, data structures can be dynamically changed to best suit the data objects and to optimally use resources of the system.

Figure 3:
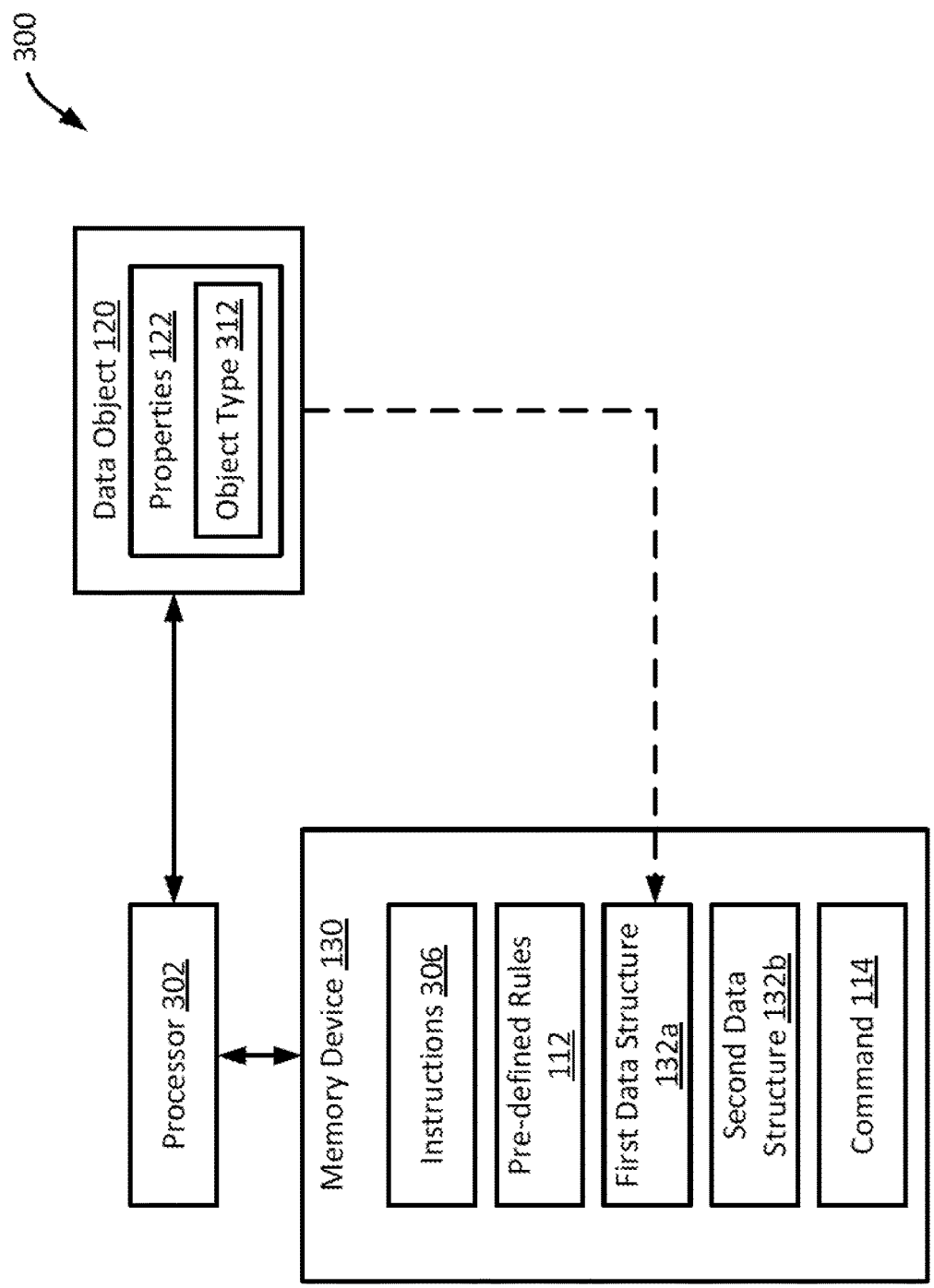
FIG. 3 shows a block diagram of an example of a system for implementing dynamic data structure usage for storing data objects according to some aspects of the present disclosure.

FIG. 3 shows a block diagram of an example of a system 300 for implementing dynamic data structure usage for storing data objects according to some aspects of the present disclosure. The system 300 can be a distributed computing environment, in some examples. The system 300 includes a processor 302 that is communicatively coupled to a memory device 130. In some examples, the processor 302 and the memory device 130 can be part of the same computing device. In other examples, the processor 302 and the memory device 130 can be distributed from (e.g., remote to) one another.

The processor 302 can include one processor or multiple processors. Non-limiting examples of the processor 302 include a Field-Programmable Gate Array (FPGA), an application-specific integrated circuit (ASIC), or a microprocessor. The processor 302 can execute instructions 306 stored in the memory device 130 to perform operations. The instructions 306 may include processor-specific instructions generated by a compiler or an interpreter from code written in any suitable computer-programming language, such as C, C++, C#, Java, or Python.

The memory device 130 can include one memory or multiple memories. The memory device 130 can be volatile or non-volatile. Non-volatile memory includes any type of memory that retains stored information when powered off. Examples of the memory device 130 include electrically erasable and programmable read-only memory (EEPROM) or flash memory. At least some of the memory device 130 can include a non-transitory computer-readable medium from which the processor 302 can read instructions 306. A non-transitory computer-readable medium can include electronic, optical, magnetic, or other storage devices capable of providing the processor 302 with computer-readable instructions or other program code. Examples of a non-transitory computer-readable medium can include a magnetic disk, a memory chip, ROM, random-access memory (RAM), an ASIC, a configured processor, and optical storage.

The processor 302 can execute the instructions 306 to perform operations. For example, the processor 302 can receive a data object 120 and properties 122 associated with the data object 120. The data object 120 may be stored on a storage device and received as part of a paging-in operation. The processor 302 can determine, based on the properties 122, an object type 312 of the data object 120. The processor 302 can determine, based on pre-defined rules 112 for data objects and corresponding object types, a first data structure 132a for storing the data object 120 that is different from a second data structure 132b currently storing data objects in the memory device 130. For example, the processor 302 can determine the first data structure 132a is to be a hash table for storing the data object 120 instead of the second data structure 132b, which is a red-black tree that is currently storing data objects in the memory device 130. The processor 302 can output a command 114 for causing the first data structure 132a to store the data object 120 in the memory device 130.

Figure 4:
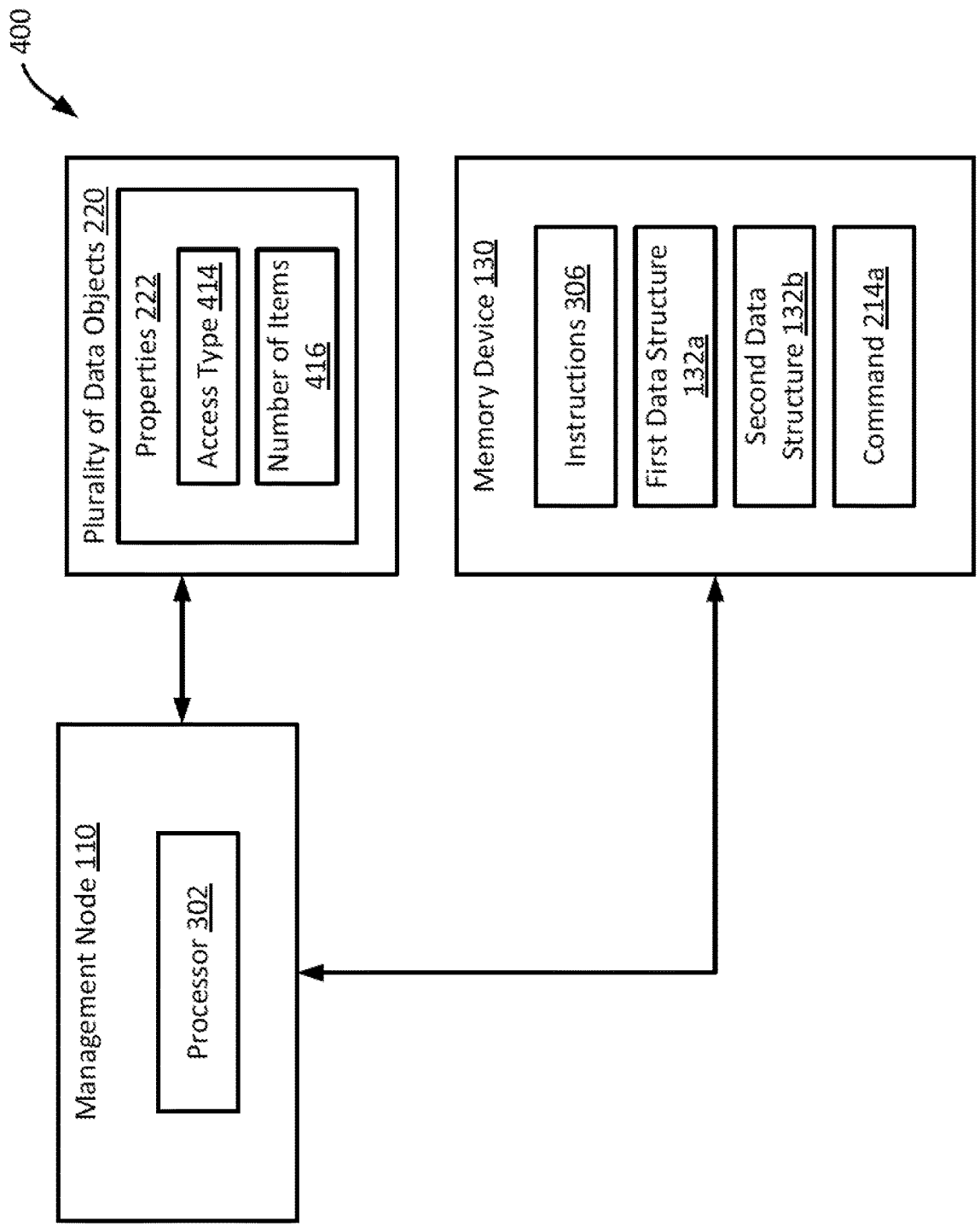
FIG. 4 shows a block diagram of another example of a system for implementing dynamic data structure usage for storing data objects according to some aspects of the present disclosure.

FIG. 4 shows a block diagram of another example of a system 400 for implementing dynamic data structure usage for storing data objects according to some aspects of the present disclosure. The system 400 may be a distributed computing system, in some examples. The system 400 includes a management node 110 communicatively coupled a plurality of data objects 220 and a memory device 130. In this example, the management node 110 includes a processor 302. The processor 302 of the management node 110 can execute instructions (e.g., instructions 306 of FIG. 3) stored in memory device 130 to perform operations, such as any of the operations described herein.

For example, the processor 302 can receive, at the management node 110 of the system 400, the plurality of data objects 220 and properties 222 associated with the plurality of data objects 220. The processor 302 can determine, by the management node 110 and based on the properties 222 associated with the plurality of data objects 220, an access type 414 for the plurality of data objects 220 and a number of items 416 associated with each data object of the plurality of data objects 220. For example, the processor 302 can determine the plurality of data objects 220 are associated with a high number of random accesses and that the number of items 416 associated with each data object is high. The processor 302 can determine, by the management node 110 and based on the access type 414 and the number of items 416 associated with each data object, a first data structure 132a for storing the plurality of data objects 220 that is different from a second data structure 132b currently storing data objects in the memory device 130. The processor 302 can output, by the management node 110, a command 214a for causing the first data structure 132a to be generated in the memory device 130.

Figure 5:
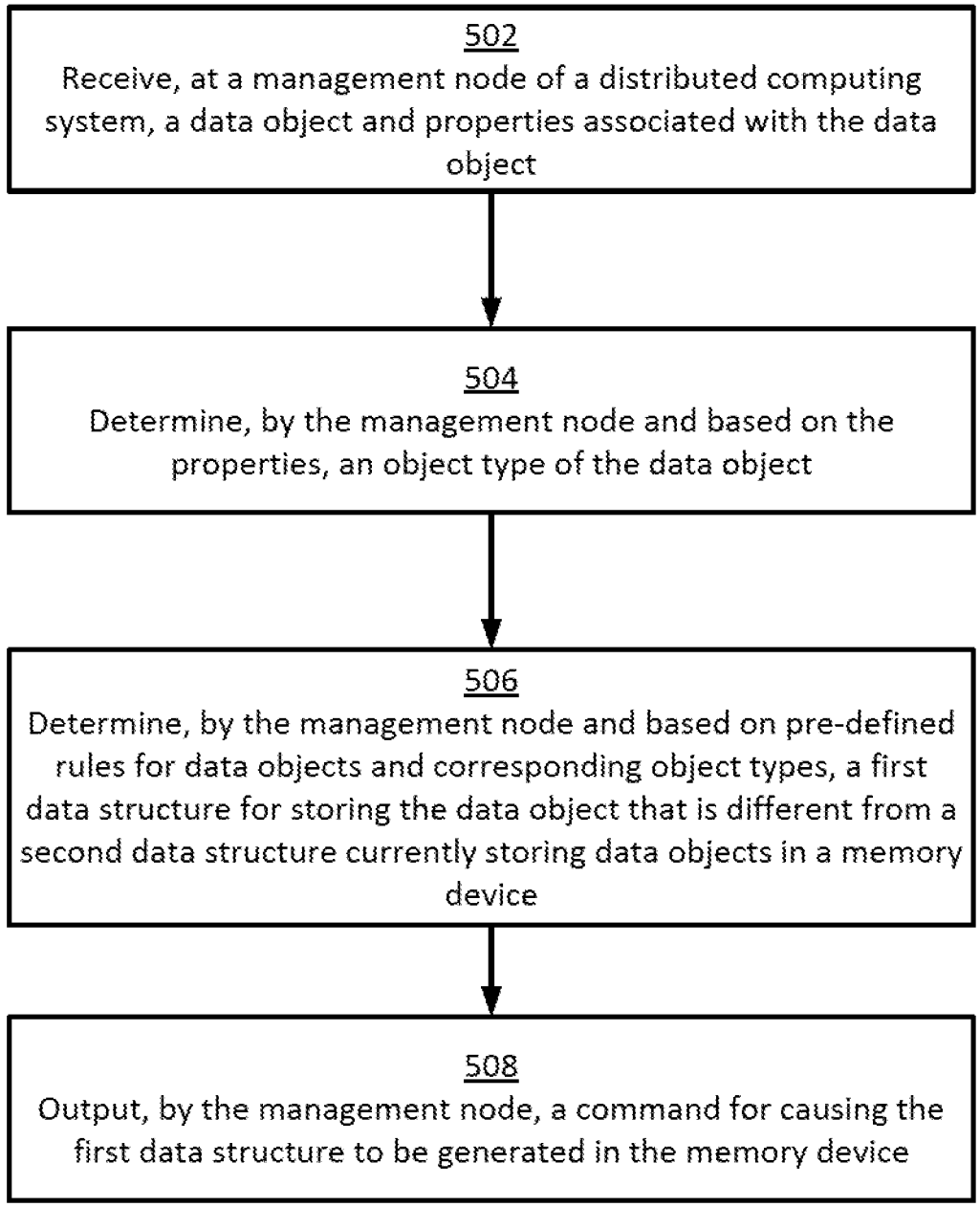
FIG. 5 shows a flow chart of an example of a process for implementing dynamic data structure usage for storing data objects according to some aspects of the present disclosure.

FIG. 5 shows a flow chart of an example of a process for implementing dynamic data structure usage for storing data objects according to some aspects of the present disclosure. Other examples can include more steps, fewer steps, different steps, or a different order of the steps than is shown in FIG. 5. The steps of FIG. 5 are discussed below with reference to the components discussed above in relation to FIGS. 3-4.

In block 502, the processor 302 receives, at the management node 110 of a distributed computing system, the data object 120 and properties 122 associated with the data object 120. The processor 302 can receive the data object 120 as a paging-in operation from a storage device to the memory device 130 or during a background-processing operation.

In block 504, the processor 302 determines, by the management node 110 and based on the properties 122, the object type 312 of the data object 120. For example, the processor 302 may determine the object type 312 is a disk extent.

In block 506, the processor 302 determines, by the management node 110 and based on pre-defined rules 112 for data objects and corresponding object types, the first data structure 132a for storing the data object 120. The first data structure 132a is different from a second data structure 132b that is currently storing data objects in the memory device 130. For example, the first data structure 132a may be a hash table and the second data structure 132b can be a red-black tree.

In block 508, the processor 302 outputs, by the management node 110, the command 114 for causing the first data structure 132a to be generated in the memory device 130. The data object 120 can then be stored in the first data structure 132a.

Figure 6:
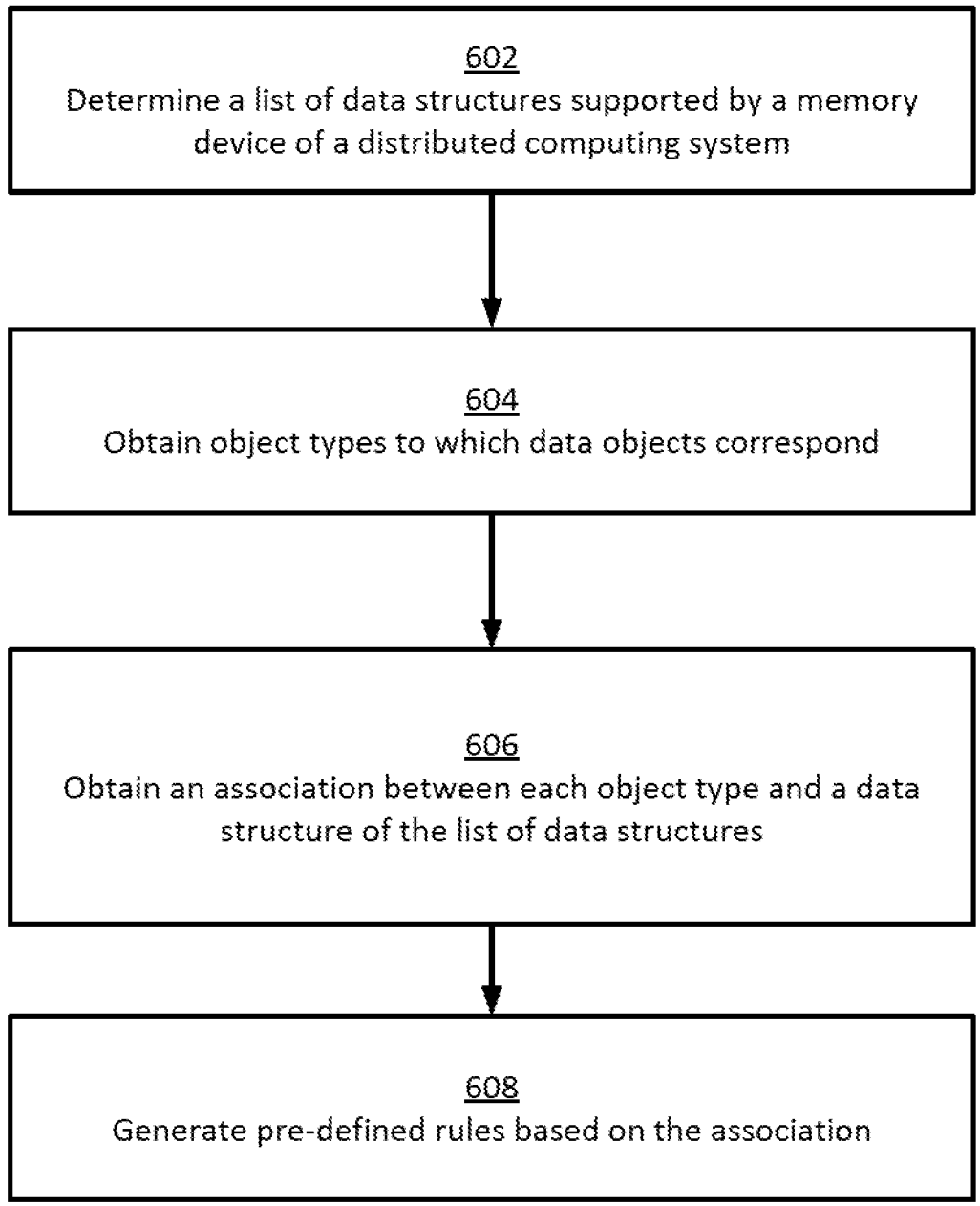
FIG. 6 shows a flow chart of an example of a process for generating pre-defined rules for data structure determination according to some aspects of the present disclosure.

To perform the above process, the processor 302 may rely on the pre-defined rules 112 for determining the first data structure 132a. In some examples, the processor 302 can automatically generate the pre-defined rules 112. One example of a process for automatically generating the pre-defined rules 112 is shown in FIG. 6. But other examples can include more steps, fewer steps, different steps, or a different order of the steps than is shown in FIG. 6. The steps of FIG. 6 are discussed below with reference to the components discussed above in relation to FIGS. 1 and 3.

In block 602, the processor 302 determines a list of data structures supported by a memory device 130 of the distributed computing system 100. The processor 302 can determine the list of data structures by communicating with the memory device 130 via a network 106, by receiving said data structures as user inputs from a user, or in another way.

In block 604, the processor 302 obtains properties 122 and corresponding values that may be associated with data objects. For example, the properties 122 may include object types with corresponding values of disk extents, directories, or other object types. The processor 302 may also obtain operations for data objects with values including searches, insertions, removals, and iterations and access types with values including random, sequential, in order, or others. The properties and corresponding values may be received based on user input, or may be generated by the processor 302 based on known values supported by the system 300.

In block 606, the processor 302 obtains an association between the properties 122 and a data structure of the list of data structures. The association may be based on a combination of one or more of the properties 122. For example, the association may be based on the object type and the number of items associated with data objects. Obtaining the association may involve receiving or generating the association. In some examples, the processor 302 can receive the association as a user input.

In block 608, the processor 302 generates the pre-defined rules 112 based on the association. For example, the processor 302 can determine the association corresponds data objects holding disk extents to a red-black tree and data objects holding directories to a vector. Thus, the pre-defined rules 112 can specify that data objects holding disk extents are to be stored in a red-black tree and data objects holding directories are to be stored in a vector. If the association is based on more than one of the properties 122, the pre-defined rules 112 can similarly include rules with a combination of the properties 122. As an example, the association may correspond data objects holding disk extents and a low number of items to a vector, so the pre-defined rules 112 can specify that data objects holding a low number of disk extents are to be stored in a vector.

Figure 7:
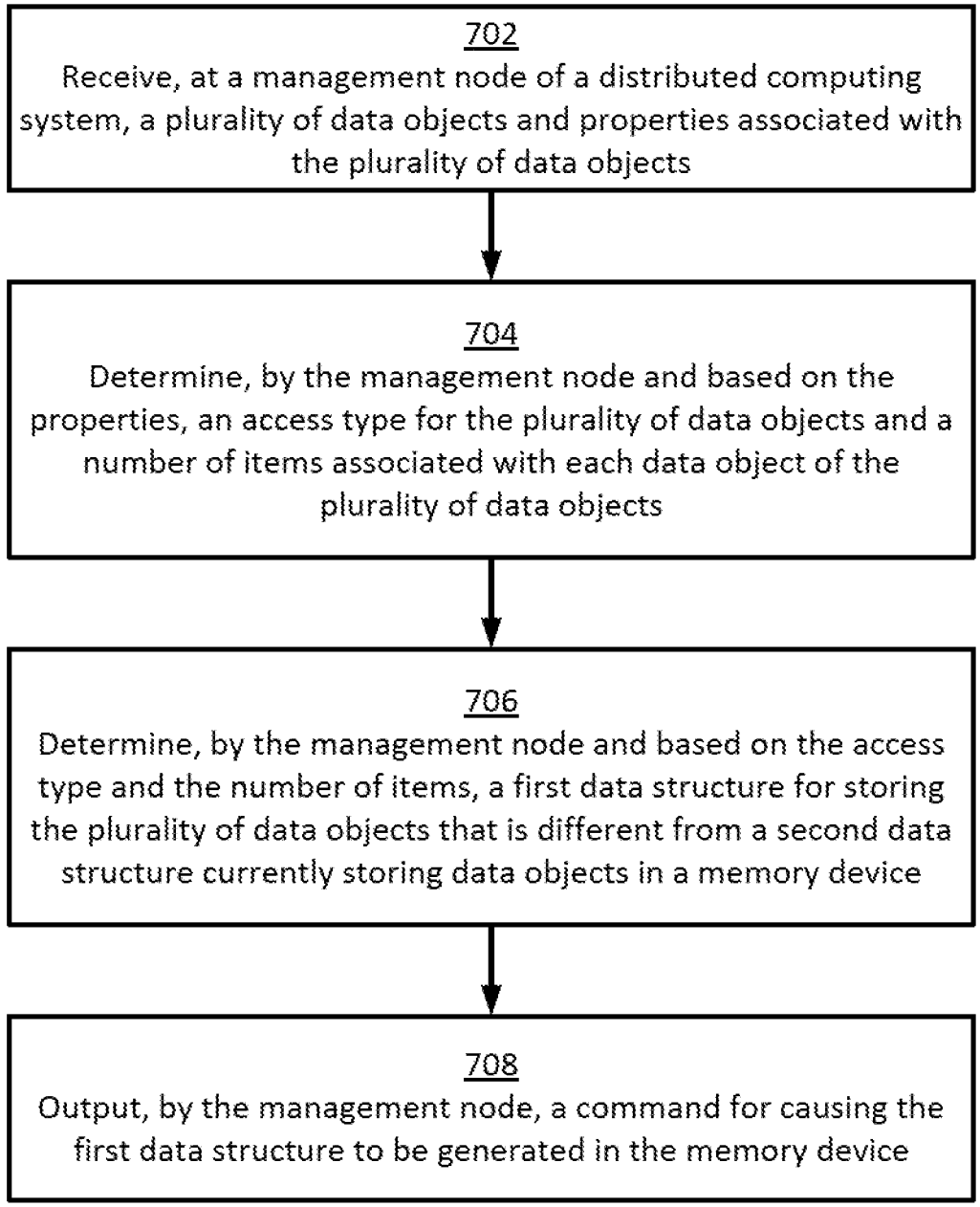
FIG. 7 shows a flow chart of another example of a process for implementing dynamic data structure usage for storing data objects according to some aspects of the present disclosure.

FIG. 7 shows a flow chart of an example of a process for implementing dynamic data structure usage for storing data objects according to some aspects of the present disclosure. Other examples can include more steps, fewer steps, different steps, or a different order of the steps than is shown in FIG. 7. The steps of FIG. 7 are discussed below with reference to the components discussed above in relation to FIGS. 3-4.

In block 702, the processor 302 receives, at a management node 110 of a distributed computing system, a plurality of data objects 220 and properties 222 associated with the plurality of data objects 220. The properties 222 can include one or more of an access type 414, a number of items 416 associated with each data object of the plurality of data objects 220, operations associated with the plurality of data objects 220, and object types for the plurality of data objects 220.

In block 704, the processor 302 determines, by the management node 110 and based on the properties 222, the access type 414 for the plurality of data objects 220 and the number of items 416 associated with each data object of the plurality of data objects 220.

In block 706, the processor 302 determines, by the management node 110 and based on the access type 414 and the number of items 416, a first data structure 132a for storing the plurality of data objects 220. The first data structure 132a is different from a second data structure 132b currently storing data objects in a memory device 130. The processor 302 may input the access type 414 and the number of items 416 to a machine-learning model to determine the first data structure 132a. Alternatively, the processor 302 may use pre-defined rules for determining the first data structure 132a.

In block 708, the processor 302 outputs, by the management node 110, a command 214a for causing the first data structure 132a to be generated in the memory device 130. The first data structure 132a may replace the second data structure 132b in the memory device 130. Subsequent to the first data structure 132a being generated, the processor 302 can store the plurality of data objects 220 in first data structure 132a in the memory device 130.

As used below, any reference to a series of examples is to be understood as a reference to each of those examples disjunctively (e.g., "Examples 1-4" is to be understood as "Examples 1, 2, 3, or 4").

Example 1 is a system comprising: a processor; and a memory device including instructions that are executable by the processor for causing the processor to: receive a data object and properties associated with the data object; determine, based on at least one of the properties or pre-defined rules for data objects and corresponding object types, an object type of the data object and a first data structure for storing the data object that is different from a second data structure currently storing data objects in the memory device; and output a command for causing the first data structure to store the data object in the memory device.

Example 2 is the system of example 1, wherein the memory device further includes instructions that are executable by the processor for causing the processor to: generate the first data structure in the memory device based on the command; and subsequent to generating the first data structure, store the data object in the first data structure.

Example 3 is the system of example(s) 1-2, wherein the memory device further includes instructions that are executable by the processor for causing the processor to generate the first data structure by replacing the second data structure with the first data structure.

Example 4 is the system of example(s) 1-3, wherein the memory device further includes instructions that are executable by the processor for causing the processor to: determine, based on the properties, a number of items in the data object; and determine, based on the pre-defined rules and the number of items, the first data structure for storing the data object.

Example 5 is the system of example(s) 1-4, wherein receiving the data object comprises a paging-in operation, an object pool operation, an object cache operation, a paging-out operation, an online-processing operation, or a background-processing operation, and wherein receiving the data object further comprises performing a data transformation on the data object.

Example 6 is the system of example(s) 1-5, wherein the memory device further includes instructions that are executable by the processor for causing the processor to: determine, based on the properties, a plurality of operations associated with the data object; and determine, based on the pre-defined rules and the plurality of operations, the first data structure for storing the data object.

Example 7 is the system of example(s) 1-6, wherein the memory device further includes instructions that are executable by the processor for causing the processor to: receive a second data object and second properties associated with the second data object; determine, based on the second properties, a second object type of the second data object; determine, based on the pre-defined rules, a third data structure for storing the second data object; and output a second command for causing the third data structure to be generated in the memory device.

Example 8 is a method comprising: receiving, at a management node of a distributed computing system, a data object and properties associated with the data object; determining, by the management node and based on the properties, an object type of the data object; determining, by the management node and based on pre-defined rules for data objects and corresponding object types, a first data structure for storing the data object that is different from a second data structure currently storing data objects in a memory device; and outputting, by the management node, a command for causing the first data structure to be generated in the memory device.

Example 9 is the method of example 8, further comprising: automatically generating, by the management node, the first data structure in the memory device based on the command; and subsequent to generating the first data structure, storing the data object in the first data structure.

Example 10 is the method of example(s) 8-9, further comprising: generating the first data structure by replacing the second data structure with the first data structure.

Example 11 is the method of example(s) 8-10, further comprising determining, based on the properties, a number of items in the data object; and determining, based on the pre-defined rules and the number of items, the first data structure for storing the data object.

Example 12 is the method of example(s) 8-11, wherein receiving the data object comprises a paging-in operation, a paging-out operation, an online-processing operation, or a background-processing operation.

Example 13 is the method of example(s) 8-12, further comprising: determining, based on the properties, a plurality of operations associated with the data object; and determining, based on the pre-defined rules and the plurality of operations, the first data structure for storing the data object.

Example 14 is a non-transitory computer-readable medium comprising program code executable by a processor for causing the processor to: generate, by a memory device, a first data structure based on a first command associated with a first plurality of data objects; receive, by the memory device, a second command indicating a second data structure is to be generated for storing a second plurality of data objects; in response to receiving the second command, generate the second data structure in the memory device; and store, in the memory device, the second plurality of data objects in the second data structure.

Example 15 is the non-transitory computer-readable medium of example 14, wherein the second data structure indicated in the second command is determined based on an access type and a number of items associated with each data object of the second plurality of data objects.

Example 16 is the non-transitory computer-readable medium of example 15, wherein the second data structure is determined by a machine-learning model.

Example 17 is the non-transitory computer-readable medium of example 16, wherein determining the second data structure by the machine-learning model comprises: inputting the access type and the number of items associated with each data object of the second plurality of data objects to the machine-learning model; and receiving a recommendation of the second data structure from the machine-learning model.

Example 18 is the non-transitory computer-readable medium of example(s) 15-17, wherein the second data structure indicated in the second command is further determined based on an object type associated with each data object of the second plurality of data objects.

Example 19 is the non-transitory computer-readable medium of example(s) 14-18, further comprising program code that is executable by the processor for causing the processor to: receive the second command indicating the first data structure is to be used for storing the second plurality of data objects; and maintain the first data structure in the memory device.

Example 20 is the non-transitory computer-readable medium of example(s) 14-18, wherein the second command is received in response to a paging-in operation, an object pool operation, an object cache operation, a paging-out operation, an online-processing operation, or a background-processing operation comprising the second plurality of data objects, and wherein the second command is received subsequent to a data transformation being performed on the second plurality of data objects.

Example 21 is a method comprising: receiving, at a management node of a distributed computing system, a plurality of data objects and properties associated with the plurality of data objects during an object page-in operation; determining, by the management node and based on the properties associated with the plurality of data objects, an access type for the plurality of data objects and a number of items associated with each data object of the plurality of data objects; determining, by the management node and based on the access type and the number of items, a first data structure for storing the plurality of data objects that is different from a second data structure currently storing data objects in a memory device; and outputting, by the management node, a command for causing the first data structure to be generated in the memory device.

Example 22 is the method of example 21, further comprising: inputting the access type and the number of items associated with each data object of the plurality of data objects to a machine-learning model; and receiving a recommendation of the first data structure from the machine-learning model.

Example 23 is the method of example(s) 21-22, further comprising: determining, based on the properties, an object type associated with each data object of the plurality of data objects; and determining, based on the object type, the access type, and the number of items associated with each data object, the first data structure for storing the plurality of data objects.

Example 24 is the method of example(s) 21-23, further comprising: storing the plurality of data objects in the first data structure subsequent to the first data structure being generated in the memory device.

Example 25 is the method of example(s) 21-24, further comprising: receiving a second plurality of data objects and second properties associated with the second plurality of data objects; determining, based on the second properties, a second access type or a second number of items associated with each data object of the second plurality of data objects; determining, based on the second access type or the second number of items, a third data structure for storing the second plurality of data objects; and outputting a second command for causing the third data structure to be generated in the memory device.

Example 26 is the method of example(s) 25, wherein generating the third data structure in the memory device comprises replacing the first data structure with the third data structure.

Example 27 is a system comprising: processing means for performing computing operations comprising: receiving a data object and properties associated with the data object; determining, based on the properties, an object type of the data object; determining, based on pre-defined rules for data objects and corresponding object types, a first data structure for storing the data object that is different from a second data structure currently storing data objects; and outputting a command for causing the first data structure to store the data object; and storage means for storing the data object in the first data structure.

Example 28 is the system of example 27, wherein the processing means is configured to receive the data object during a paging-in operation, an object pool operation, an object cache operation, a paging-out operation, an online-processing operation, or a background-processing operation, and wherein receiving the data object further comprises performing a data transformation on the data object.

Example 29 is the system of example(s) 27-28, wherein the processing means further performs computing operations comprising: determining, based on the properties, a number of items in the data object; and determining, based on the pre-defined rules and the number of items, the first data structure for storing the data object.

Example 30 is the system of example(s) 27-29, wherein the processing means further performs computing operations comprising: determining, based on the properties, a plurality of operations associated with the data object; and determining, based on the pre-defined rules and the plurality of operations, the first data structure for storing the data object.

Example 31 is the system of example(s) 27-30, wherein the processing means is configured to receive the data object in response to an operation performed using an application programming interface (API) that is shared by the first data structure and the second data structure.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any examples described herein can be combined with any other examples to yield further examples.

The invention claimed is:

1. A system comprising:
a processor; and
a memory device including instructions that are executable by the processor for causing the processor to:
receive a data object and properties associated with the data object;
determine, by a machine learning model and based on at least one of the properties, a first data structure from a plurality of data structures for storing the data object that is different from a second data structure from the plurality of data structures currently storing data objects in the memory device, each of the plurality of data structures being a different type of storage organization in the memory device, the machine learning model being configured to recommend the first data structure from the plurality of data structures for data objects by:
generating training data by performing operations in a computing system or based on logged information about data objects in the computing system, the training data including consisting of historical information about access types and numbers of items associated with the data objects, and further including labels indicating a data structure from the plurality of data structures for storing the data objects;
training the machine learning model to recommend the first data structure from the plurality of data structures based on the first data structure being associated with a lowest resource usage of the plurality of data structures by minimizing one or more loss functions using the training data; and
subsequent to training the machine learning model, configuring the machine learning model to receive the properties including an access type and a number of items associated with the data object and to output a recommendation of the first data structure from the plurality of data structures;
output a command for causing the first data structure to store the data object in the memory device; and
generate the first data structure in the memory device based on the command.

2. The system of claim 1, wherein the memory device further includes instructions that are executable by the processor for causing the processor to:
  subsequent to generating the first data structure, store the data object in the first data structure.

3. The system of claim 1, wherein the memory device further includes instructions that are executable by the processor for causing the processor to generate the first data structure by replacing the second data structure with the first data structure.

4. The system of claim 1, wherein the memory device further includes instructions that are executable by the processor for causing the processor to:
  determine, based on the properties, the number of items in the data object; and
  determine, based on the number of items, the first data structure for storing the data object.

5. The system of claim 1, wherein receiving the data object comprises a paging-in operation, an object pool operation, an object cache operation, a paging-out operation, an online-processing operation, or a background-processing operation, and
  wherein receiving the data object further comprises performing a data transformation on the data object.

6. The system of claim 1, wherein the memory device further includes instructions that are executable by the processor for causing the processor to:
  determine, based on the properties, a plurality of operations associated with the data object; and
  determine, based on the plurality of operations, the first data structure for storing the data object.

7. The system of claim 1, wherein the memory device further includes instructions that are executable by the processor for causing the processor to:
  receive a second data object and second properties associated with the second data object;
  determine, based on the second properties, a second object type of the second data object;
  determine a third data structure from the plurality of data structures for storing the second data object; and
  output a second command for causing the third data structure to be generated in the memory device.

8. A method comprising:
  receiving, at a management node of a distributed computing system, a data object and properties associated with the data object;
  determining, by the management node and based on the properties, an object type of the data object;
  determining, by the management node and by a machine learning model and based on at least one of the properties, a first data structure from a plurality of data structures for storing the data object that is different from a second data structure from the plurality of data structures currently storing data objects in a memory device, each of the plurality of data structures being a different type of storage organization in the memory device, the machine learning model being configured to recommend the first data structure from the plurality of data structures for data objects by:
    generating training data by performing operations in a computing system or based on logged information about data objects in the computing system, the training data consisting of historical information about access types and numbers of items associated with the data objects, object types, and further including labels indicating a data structure from the plurality of data structures for storing the data objects;
    training the machine learning model to recommend the first data structure from the plurality of data structures based on the first data structure being associated with a lowest resource usage of the plurality of data structures by minimizing one or more loss functions using the training data; and
    subsequent to training the machine learning model, configuring the machine learning model to receive the properties including an access type and a number of items associated with the data object and to output a recommendation of the first data structure from the plurality of data structures;
  outputting, by the management node, a command for causing the first data structure to be generated in the memory device; and
  automatically generating, by the management node, the first data structure in the memory device based on the command.

9. The method of claim 8, further comprising:
  subsequent to generating the first data structure, storing the data object in the first data structure.

10. The method of claim 8, further comprising:
  generating the first data structure by replacing the second data structure with the first data structure.

11. The method of claim 8, further comprising:
  determining, based on the properties, the number of items in the data object; and
  determining, based on number of items, the first data structure for storing the data object.

12. The method of claim 8, wherein receiving the data object comprises a paging-in operation, a paging-out operation, an online-processing operation, or a background-processing operation.

13. The method of claim 8, further comprising:
  determining, based on the properties, a plurality of operations associated with the data object; and
  determining, based on the plurality of operations, the first data structure for storing the data object.

14. A non-transitory computer-readable medium comprising program code executable by a processor for causing the processor to:
  generate, by a memory device, a first data structure from a plurality of data structures based on a first command associated with a first plurality of data objects of a first object type;
  determine, by the memory device and by a machine learning model and based on at least one property of a second plurality of data objects, a second data structure from the plurality of data structures for storing the second plurality of data objects of a second object type that is different than the first object type, each of the data structures being a different type of storage organization in the memory device, the machine learning model being configured to recommend the second data structure from the plurality of data structures for data objects by:
    generating training data by performing operations in a computing system or based on logged information about data objects in the computing system, the training data consisting of historical information about access types and numbers of items associated with the data objects, and further including labels indicating a data structure from the plurality of data structures for storing the data objects;

training the machine learning model to recommend the second data structure from the plurality of data structures based on the second data structure being associated with a lowest resource usage of the plurality of data structures by minimizing one or more loss functions using the training data; and subsequent to training the machine learning model, configuring the machine learning model to receive the properties including an access type and a number of items associated with the second plurality of data objects and to output a recommendation of the second data structure from the plurality of data structures;

receive, by the memory device, a second command indicating the second data structure is to be generated for storing the second plurality of data objects;

in response to receiving the second command, generate the second data structure in the memory device; and store, in the memory device, the second plurality of data objects in the second data structure.

15. The non-transitory computer-readable medium of claim 14, wherein determining the second data structure by the machine-learning model comprises:

inputting the access type and the number of items associated with each data object of the second plurality of data objects to the machine-learning model; and receiving the recommendation of the second data structure from the machine-learning model.

16. The non-transitory computer-readable medium of claim 14, further comprising program code that is executable by the processor for causing the processor to:

receive the second command indicating the first data structure is to be used for storing the second plurality of data objects; and maintain the first data structure in the memory device.

17. The non-transitory computer-readable medium of claim 14, wherein the second command is received in response to a paging-in operation, an object pool operation, an object cache operation, a paging-out operation, an online-processing operation, or a background-processing operation comprising the second plurality of data objects, and wherein the second command is received subsequent to a data transformation being performed on the second plurality of data objects.

* * * * *